United States Patent [19]
Kondo

[11] Patent Number: 5,457,512
[45] Date of Patent: Oct. 10, 1995

[54] FOCUS-SWITCHING CAMERA

[75] Inventor: Makoto Kondo, Sagamihara, Japan

[73] Assignee: Canon Kabushiki Kaisha, Japan

[21] Appl. No.: 82,509

[22] Filed: Jun. 25, 1993

Related U.S. Application Data

[63] Continuation of Ser. No. 708,808, May 31, 1991, abandoned, which is a continuation of Ser. No. 372,013, Jun. 27, 1989, abandoned.

[30] Foreign Application Priority Data

Jun. 29, 1988 [JP] Japan .................... 63-163106

[51] Int. Cl.$^6$ .................... G03B 13/36
[52] U.S. Cl. .................... 354/400; 354/195.1; 348/345
[58] Field of Search .................... 354/400, 402, 354/195.1, 195.12, 195.13; 348/345

[56] References Cited

U.S. PATENT DOCUMENTS

| | | | |
|---|---|---|---|
| 4,529,283 | 7/1985 | Ognima et al. | 354/195.12 |
| 4,544,249 | 10/1985 | Maemori et al. | 354/195.12 |

Primary Examiner—Russell E. Adams
Attorney, Agent, or Firm—Fitzpatrick, Cella, Harper & Scinto

[57] ABSTRACT

Apparatus for use in a focus-switching camera having an imaging optical system an optical condition (for example, a focal length) of which can be switched includes a detection circuit for detecting that the optical system is undergoing a focal length switching operation, and a successive control circuit for prohibiting a picture recording operation when the detection circuit detects that the optical system is undergoing a focal length switching operation. The camera may also include a successive photographing function, and the control circuit (1) stops successive photographing when the detection circuit has detected that the optical system is undergoing a focal length switching operation during successive photographing, and (2) resumes successive photographing when the optical system is no longer undergoing a focal length switching operation. When resuming successive photographing, the control circuit preferably determines whether or not predetermined characteristics of the optical system have changed from the moment before successive photographing has been stopped, and when there is a change in the predetermined characteristics, the control circuit resumes successive photographing after (1) measuring parameters corresponding to the changed characteristics of the optical system, and (2) resetting the parameters.

20 Claims, 10 Drawing Sheets

TO SYSTEM CONTROLLER 50

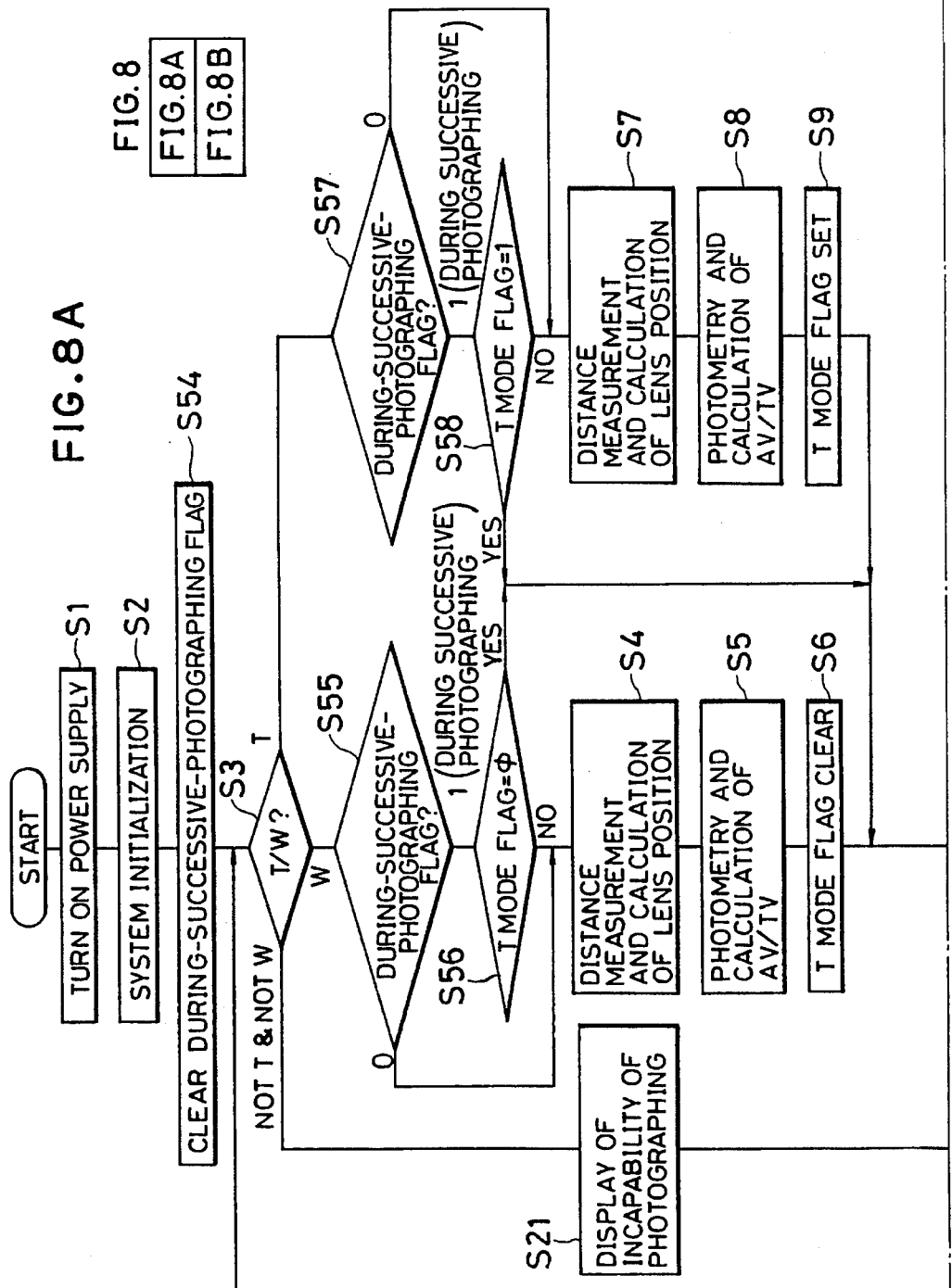

FOCUS-SWITCHING CAMERA

This application is a continuation of application Ser. No. 07/708,808 filed May 31, 1991, which is a continuation of application Ser. No. 07/372,013 filed Jun. 27, 1989, both of which are now abandoned.

BACKGROUND OF THE INVENTION

1. Field of the Invention

This invention relates to a so-called multifocal camera which can image on one photosensitive device (an imaging device a film and the like) by changing at least two optical systems.

2. Description of the Prior Art

Heretofore, there has been known a camera configuration in which, in order to prevent a switching operation of a T (telephoto)⇆W (wide) optical system during photographing, a signal from a T⇆W switch member is input to a system controller which determines if the situation is favorable fox actually switching the T⇆W optical system, without directly coupling the T⇆W switch member with the switching mechanism of the T⇆W optical system. According to this configuration, even when the T⇆W switch member is operated during photographing, it is possible to prevent the recording of an abnormal image by not performing the actual switching of the T⇆W optical system.

In the prior art, however, the T⇆W switch member is not directly connected to the switching mechanism of the T⇆W optical system, but is connected to an actuator (a motor) which is used for switching the mechanism of the T⇆W optical system.

However, this approach is more expensive than mechanically coupling the T⇆W switch member to the switching mechanism of the optical system.

Also, since battery energy is utilized for operation of the T⇆W switching mechanism, the number of frames capable of being photographed by one set of batteries is reduced. In an extreme case, a battery may be used up by repeated T⇆W switching operations.

Futhermore, when it is intended to perform T⇆W switching during successive photographs, it is necessary to lift a finger from the shutter release button, then activate the T⇆W switch member, and subsequently press the shutter release button again.

SUMMARY OF THE INVENTION

It is an object of the present invention to prevent the recording of an abnormal image when trying to change the focal characteristics of an optical system in a camera having an imaging optical system in which the focal characteristics of the optical system can be varied, by providing means for detecting whether or not the optical system is capable of producing a normal image and prohibiting exposure using an output of the detection means in order to prevent an abnormal image from being recorded.

In one aspect of the present invention, apparatus for use with a focus-switching camera having an imaging optical system, optical conditions of which can be switched, includes detection circuitry for detecting that the optical system is undergoing an optical switching operation, and control circuitry for prohibiting a successive picture recording operation when the detection circuitry detects that the optical system is undergoing an optical switching operation.

According to another aspect of the present invention, apparatus for controlling a camera having an optical system with changeable optical conditions includes detection means for detecting when the camera optical conditions begin to change, and processing means for prohibiting the camera from recording a successor picture when the detection means detects that the camera optical system conditions have begun to change.

DETAILED DESCRIPTION OF THE PREFERRED EMBODIMENTS

Figure 1:
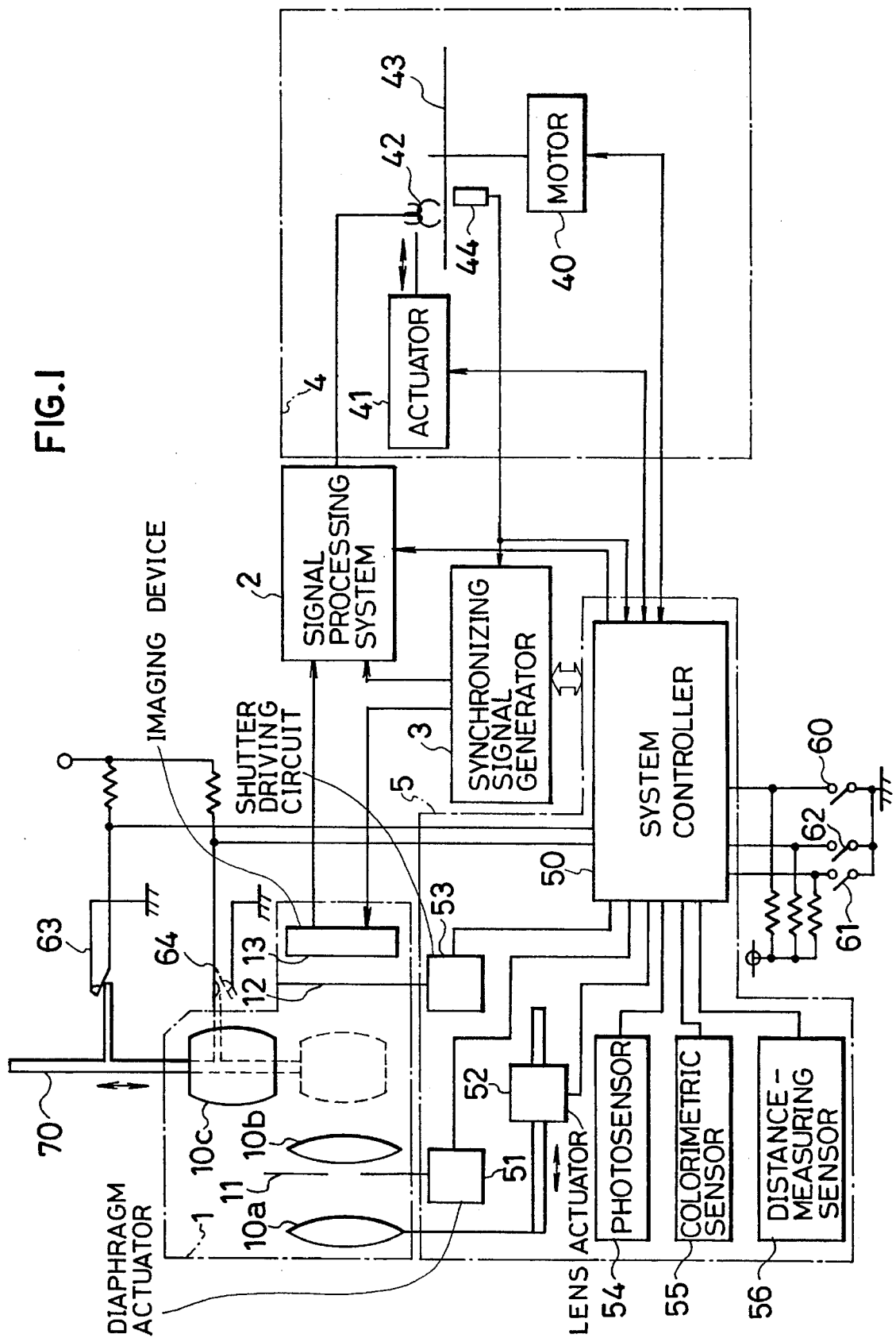
FIG. 1 is a block diagram of an electronic still-picture camera of a first embodiment of the present invention.

FIG. 1 shows a first embodiment of the present invention. In FIG. 1, there is shown an electronic still-picture camera having an optical system with two kinds of switchable focal lengths. An imaging optical system 1 includes imaging lenses 10a, 10b and 10c, a diaphragm 11, a shutter 12, an imaging device 13, a lens 10a for adjusting a focal position, and a lens 10c for varying a focal length (a rear converter lens). A signal processing system 2 performs signal processing on an output of the imaging device 13, such as white balance correction, γ correction and the like, formation, modulation, mixing and amplification of brightness and color-difference signals, and the like. A synchronizing signal generator (termed hereinafter an SSG) 3 generates pulses for removing unnecessary charges and reading signals from the imaging device, pulses for clamping and synchronization and the like corresponding to control of the system controller 50 and in accordance with an output of a PG sensor 44. There is also shown a floppy disk drive system 4. A spindle motor 40 includes a servo system and is start/stop controlled by a system controller 50 and can send out signals corresponding to its rotating state (during acceleration, during normal rotation and the like) to the system controller 50. A head actuator 41 moves a recording head 42 from track to track on an SV (still video) floppy disk 43 by control of the system controller 50. There are also shown the recording head 42 for electromagnetic conversion of signals, and the SV floppy disk 43 as a recording medium. The PG sensor 44 outputs a PG pulse for every rotation of the floppy disk in synchronization with the position of a yoke of the floppy disk. There is also shown a control system 5. The system controller 50 processes state signals and the like from switches 60–64, various sensors (54–56), the SSG 3, the PG sensor 44, and the spindle motor 40. System controller 50 also controls various kinds of actuators 51–53, the SSG 3, the signal processing system 2, the spindle motor 40, the head actuator 41 and the like. There are also shown a diaphragm actuator 51, a lens actuator 52 for focusing, a shutter driving circuit 53, a photosensor 54, a colorimetric sensor 55, and a distance-measuring sensor 56. Also shown are a switch 60 (termed hereinafter an SCSW) for successive photographing/single-shot photographing switching, a switch 61 (termed hereinafter an SW1) linked with a first stroke of a shutter release button, a switch 62 (termed hereinafter an SW2) linked with a second stroke of the shutter release button, a switch 63 (termed hereinafter a WSW) for detecting that the rear converter lens 10c is located at a wide (non-inserting) position, and a switch 64 (termed hereinafter a TSW) for detecting that the rear converter lens 10c is at a telephoto (inserting) position. An operation member 70 (termed hereinafter a T/W switching member) is for switching the rear converter lens 10c between the wide (non-inserting) position and the telephoto (inserting) position.

Operation of the electronic still-picture camera having a configuration as described above will now be explained with reference to the flow charts depicted in FIGS. 2 and 3. When the SW1 (61) is turned on at S1, power from a power supply (not shown) is applied to the entire system, and initialization of the system is then performed at S2. By the initialization, memory registers within the system controller are initialized, start and constant-speed control of the spindle motor 40 is performed, and the signal processing system 2 and the SSG 3 are placed in a standby state. Upon the completion of the initialization, the status of the TSW 64 and the WSW 63 of the imaging system are detected at S3. If, for example, the WSW 63 is turned on, distance measurement and calculations for driving the lens toward a focusing position are performed in accordance with the focal length and the like at S4. Subsequently, photometry and calculation of a diaphragm value Av and a shutter speed time Tv according to data of the photometry are performed at S5, a T mode flag is cleared at S6, and the process proceeds to S10. When the TSW 64 is turned on at S3, various calculations are similarly performed at S7 and S8, the T (telephoto) mode flag is set at S9, and the process then proceeds to S10. At S10, colorimetric measurement and calculations for white balance are performed. At S11, the results of the distance measurement, colorimetric measurement, photometry and calculations thereof, and the number of remaining tracks held in a rewritable nonvolatile memory within the system controller and the like are displayed on a liquid crystal display ay (not illustrated). Then at S12–S14, the state of the T mode flag is compared with the states of the TSW 64 and the WSW 63. If the states coincide with each other, the state of the SW2 (62) is detected at S15. If not, the process jumps to S18.

Figure 3:
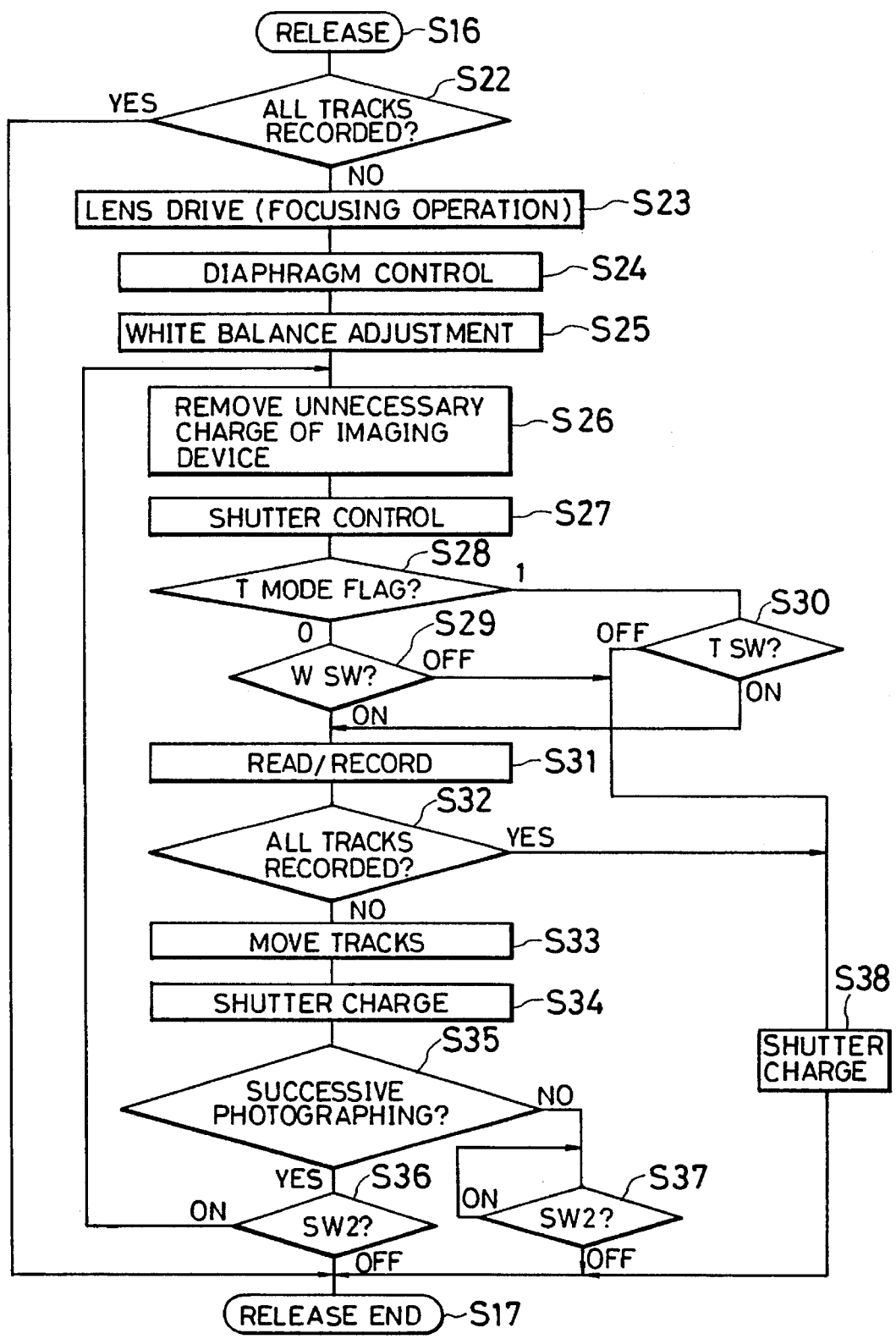

If it is determined that the SW2 is turned on at S15, the process proceeds to a release routine at S16 (FIG. 3). If the SW2 is turned off at S15, the state of the SW1 (61) is detected at S18. As a result, if the SW1 (61) is turned on at S18, the process returns to S3, where the above-described routine is repeated immediately after the system initialization. If the SW1 (61) is turned off at S18, a system-end processing (operations for stopping the spindle motor 40, operations for writing the number of remaining tracks in the rewritable nonvolatile memory within the system controller and the like) is performed, and the power supply of the system is then turned off at S20.

If both of the TSW 64 and the WSW 63 are turned off at S3, this indicates an intermediate state in which the rear converter lens 10c is neither at the telephoto postion nor at the wide position. Hence, a display indicates that the camera is incapable of photographing at S21, and the process proceeds to S18.

A release subroutine from S16 to S17 will be now explained with reference to FIG. 3. First, it is determined whether all tracks have been recorded at S22. In the case of a floppy disk in which all tracks have been recorded, that is, where there are no remaining tracks, the process jumps from the release processing to S17. In other cases (in cases in which there are remaining tracks), the lens 10a is driven to the lens position obtained at S4 and S7 using the lens actuator 52 at S23. At S24, the diaphragm 11 is adjusted to the diagphragm value obtained at S5 and S8 using the diaphragm actuator 51. At S25, the corrected value of white balance obtained at S10 is supplied to the signal processing system 2 to prepare for photographing and recording. After the completion of these preparatory processes, unnecessary charges on the imaging device 13 are removed by controlling the SSG 3 at S26, and exposure is then performed for the shutter speed time interval obtained in S5 and S8, at S27. After the exposure operation, the T mode flag is compared again with the TSW 64 and the WSW 63, and coincidence between the two states is checked at S28–S30. By the processes of S28–S30, it is possible to detect whether or not the state of the imaging optical system has changed during execution of photometry and distance measurement and actual execution of the exposure. If the imaging optical system has changed during execution of photometry and distance measurement and actual execution of the exposure, it is impossible to obtain a proper exposure and a well-focused image. In this case, therefore, the process jumps to S38 without reading the imaging device 13 and recording on the floppy disk 42, and the shutter is charged again at S38, and the process proceeds to S17 and S18 to return to the state where only the SW1 (61) is turned on. When the state of the optical system is identical to that at the moment of photometry and distance measurement when the state of the optical system is checked at S28–S30, the process directly proceeds to S31, where signals from the imaging device 13 are read, and recorded on the floppy disk 43. Subsequently, the remaining tracks of the floppy disk are checked at S32. If unrecorded tracks remain, track feeding is performed at S33, and the shutter is charged at S34. When there is no remaining track at S32, only the shutter charge is performed at S38 without performing track feeding, and the process proceeds to S18 via S17 to return to the state where only the SW1 (61) is turned on.

After performing shutter charge at S34, it is determined whether or not the camera is set in the successive photographing mode at S35. When the camera is in the successive photographing mode, and when the SW2 (62) is turned on at S36, the process returns again to S26, where operations after S26 are repeated. In the case of the single-shot photographing mode at S35, the process proceeds to S17 after determining that the SW2 (62) is turned off at S37 to get out of the release subroutine. Since the algorithm is thus configured, in the successive photographing mode, a comparison is performed with the state of the optical system at photometry and distance measurement immediately before a first exposure every time an actual exposure has been completed. When the states of the optical system do not coincide with each other, reading from the imaging device 13 and recording on the floppy disk 43 are stopped, the shutter is charged for preparing for the next exposure, a waiting is performed until the optical system is set at the telephoto or wide state, and photometry, distance measurement and calculations thereof are executed relative to the optical system which has been subsequently and newly set at T or W. In this case, when the SW2 (62) is turned on at the momemt of the completion of the above-described photometry and distance measurement, release processing is performed again and the exposure operation, once stopped, is resumed.

Figure 4:
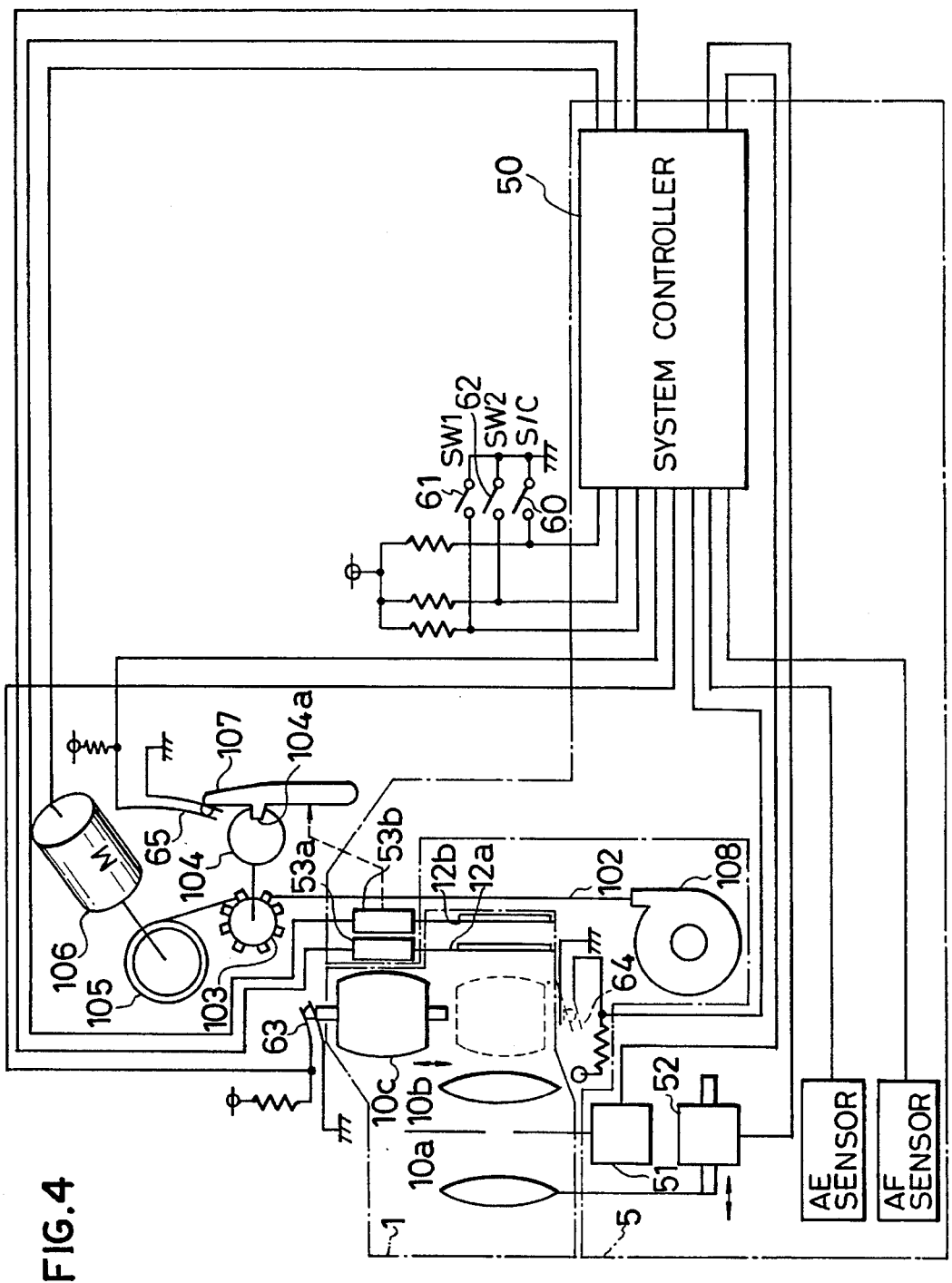
FIG. 4 is a schematic diagram of a second embodiment in which the present invention is applied to a camera using a silver-salt film.

FIG. 4 is a second embodiment of the present invention.

In FIG. 4, there is shown a camera using a silver-halide film and having a bifocal optical system. Relative to this configuration, like components as those in the electronic still-picture camera are indicated by like numerals, and only components different from those in the electronic still-picture camera will be explained.

In FIG. 4, there are shown a front screen 12a and a rear screen 12b of a shutter, and a film 102. An inverted sprocket 103 rotates once for every frame meshing with a film perforation in accordance with a film winding operation. A cam 104 provided on the same shaft as that of the inverted sprocket 103 has a notch 104a, and its rotation is regulated by meshing with a lever 107. A spool 105 is for winding the film. A winding motor 106 is for driving the spool 105. The lever 107 is for stopping the inverted sprocket 103 after one rotation meshing with the cam 104, and simultaneously turning on a switch 65 for transmitting a signal indicating the completion of the winding of one frame to the system controller 50 when the above-described sprocket is stopped. There are also shown a film magazine 108, a switch 65 (termed hereinafter a winding Completion SW) for detecting the completion of the winding of one frame of the film, an actuator 53a for driving the front screen of the shutter, and an actuator 53b for driving the rear screen of the shutter. When the actuator 53b has completed running of the rear screen 12b of the shutter , the lever 107 is disengaged from the notch 104a by an electromagnet or the like (not illustrated) to make possible winding of the film. It is to be noted that, in the explanation of the present embodiment, the camera is configured such that shutter charge can be individually performed by the actuators 53a and 53b separately from the winding motor 106.

Figure 5:
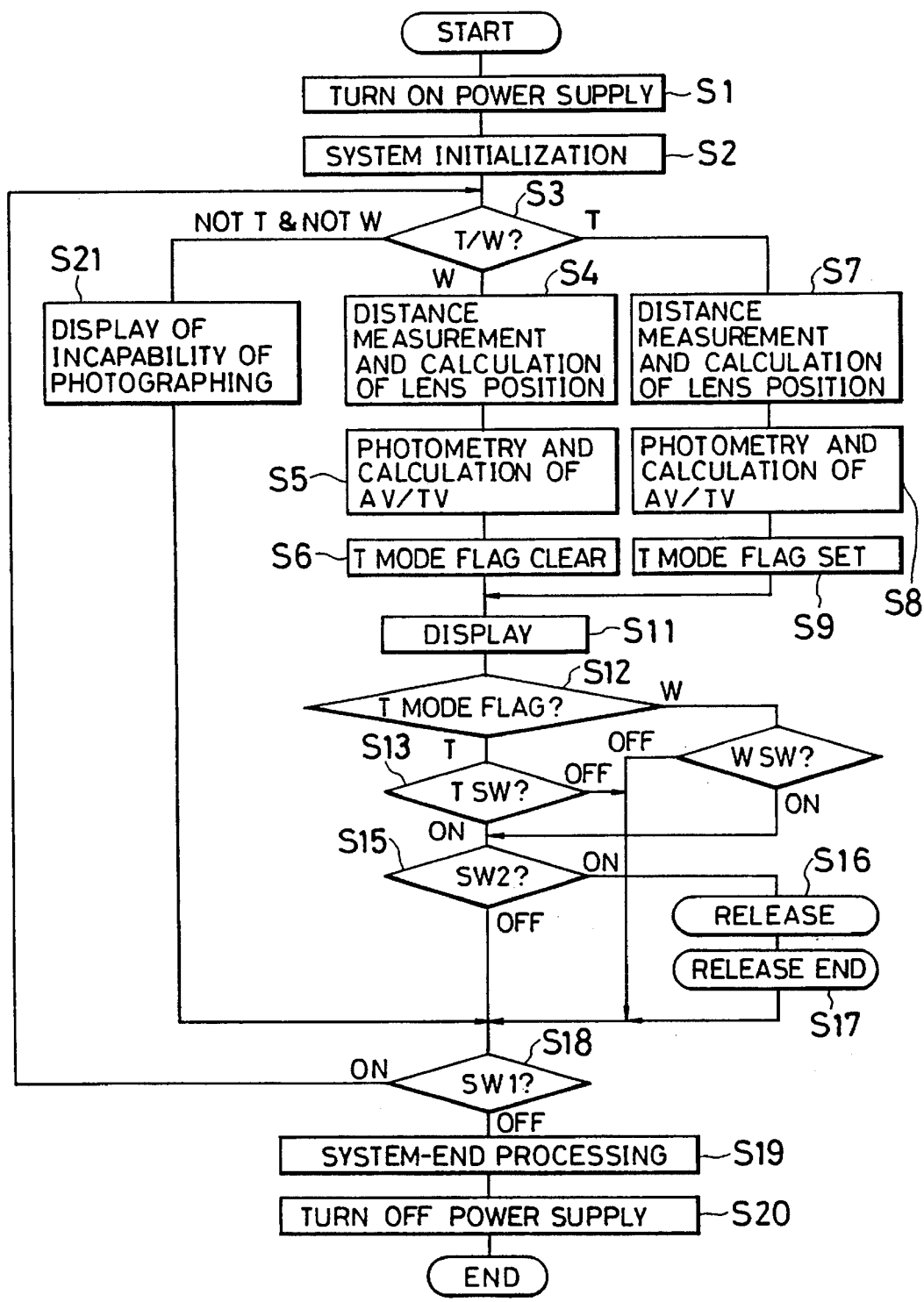
FIGS. 5 and 6 are flow charts of the second embodiment.
Figure 6:
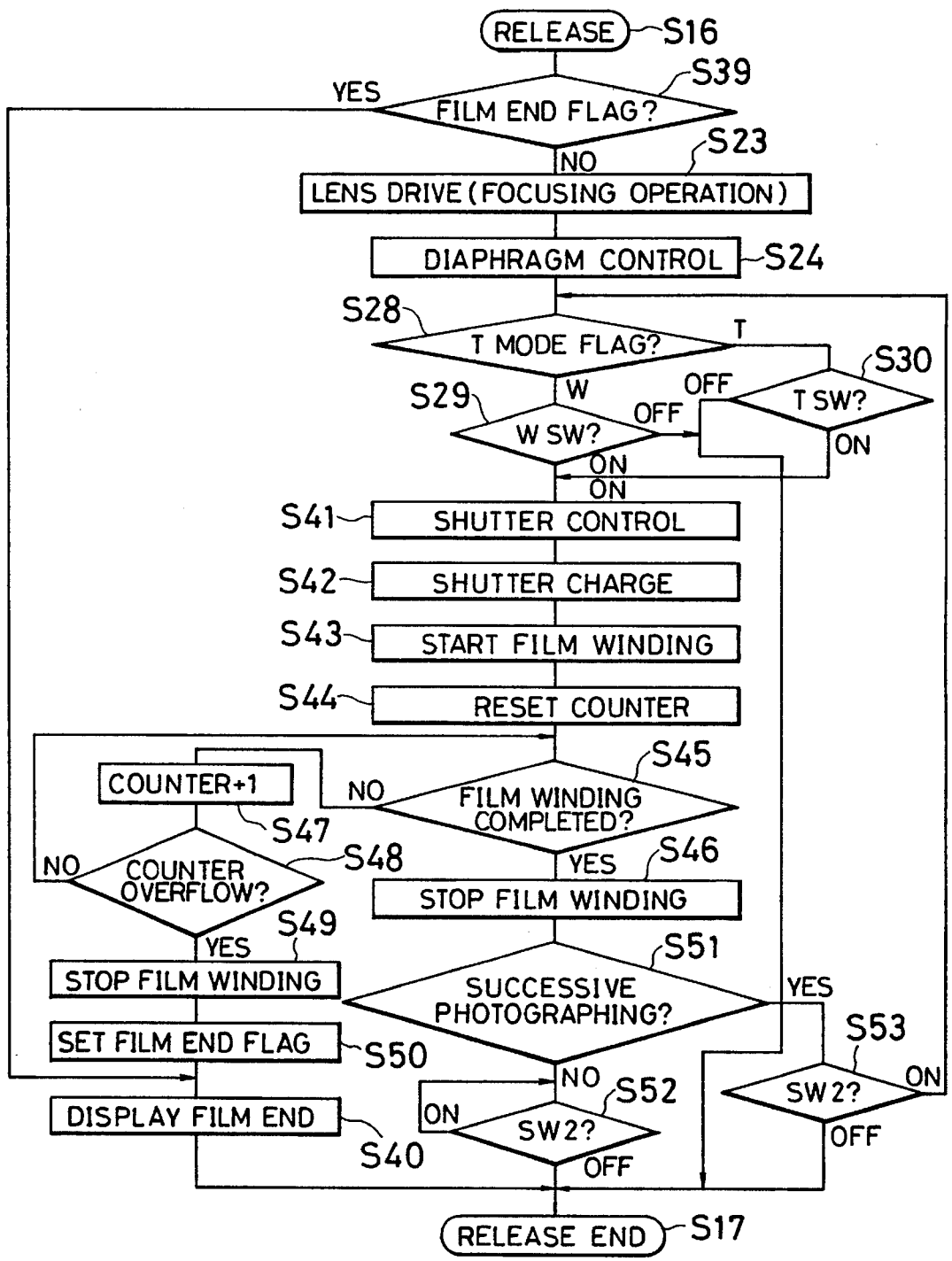

In the configuration as described above, operation of the present embodiment will be explained with reference to Flow charts in FIGS. 5 and 6. In the flow charts in FIGS. 5 and 6, steps like those in the flow charts in FIGS. 2 and 3 are indicated by like numerals. First, when the SW1 is turned on, power from a power supply is supplied to the entire system, and system initialization (reset of memories and registers within the system conroller, reset of the mechanisms (for example, shutter charge, continuation of winding when a power supply is turned off during winding, and the like), reading the value of the film counter from the rewritable nonvolatile memory by the system controller 50, and the like) are performed. Subsequently, the TSW 64 and the WSW 63 are read. When both of the TSW 64 and the WSW 63 are turned off, it is deemed as an abnormal state (a state in which a normal image is not focused on the film surface) in which the imaging optical system is neither at the telephoto position nor at the wide position, and a display indicating incapability of photographing is continued until either of the TSW 64 and the WSW 63 is turned on.

When either of the WSW 63 and the TSW 64 is turned on, photometry and distance measurement are performed. When calculating the diaphragm value and shutter speed time in accordance with the brightness of an object from the result of the photometry, a so-called program diaphragm is changed corresponding to a difference in the open diaphragm value and focal length of respective lens. Similarly, when the position of the lens 10a is calculated from the result of the distance measurement, a zone is determined taking into consideration a difference in focal length. When the TSW 64 is turned on, the T mode flag is set at 1, at S9. When the WSW 64 is turned on, the T mode flag is cleared at 0 at S6. Subsequently, after performing various displays (film-end display, counter display, display of diaphragm and shutter speed, and the like) at S11, the on/off state of the SW2 is checked at S15 only when the mode of the optical system stored at the T mode flag coincides with the modes of the TSW 64 and the WSW 63, at S12–S14. At this time, if the SW2 is turned on, release processing (FIG. 6) is performed, and if the SW2 is turned the off, on/off state of the SW1 (61) is checked. When the state of the T mode flag differs from the states of the TSW 64 and the WSW 63, the SW2 (62) is not checked, but the SW1 (61) is checked. When the SW1 (61) is turned off in both cases, end processing of the system (recording of the content of the film counter and the film end flag in the rewritable nonvolatile memory and the like) are performed, and the power supply of the system is then turned off to end the processing. When the SW1 (61) is turned on, the processing as described above is repeated after the system initialization.

Release processing will be now explained with reference to FIG. 6. First, when exposure of the entire film is completed at S39, the process proceeds to S17 after only displaying film end at S40 to get out of release processing. When the entire film is not exposed at S39, focusing operation and diaphragm control are performed at S23 and S24, respectively, and the T mode flag is then compared with the TSW 64 and the WSW 63 at S28–S30.

When the T mode flag does not coincide with the states of the TSW 64 and the WSW 63 (when the T mode flag is 1 and the TSW 64 is turned off, or when the T mode flag is 0 and the WSW is turned off), the process proceeds to S17 without performing the subsequent processings to get out of the release routine.

When the state of the T mode flag coincides with the states of the TSW 64 and the WSW 63 (when the T mode flag is 1 and the TSW 64 is turned on, or when the T mode flag is 0 and the WSW 63 is turned on), the shutters 12a and 12b are controlled using the shutter actuators 53a and 53b at S41 so that exposure is performed on the film surface for the shutter speed time calculated at S5 and S8 before entering into the release operation. After exposure, the shutters 12a and 12b are charged at S42, and film winding is started using the winding motor 106 at S43. Subsequently, the counter is reset at S44. The spool 105 is rotated by the winding motor except when the film is entirely exposed. The film is thereby wound, and the inverted sprocket 103 meshed with the perforation of the film is rotated. When the cam 104 on the same shaft as that of the inverted sprocket 103 is rotated once, the lever 107 drops into the notch 104a of the cam 104 to stop the rotation of the cam 104 and the sprocket 103 and switches on the winding completion switch 65. As soon as the switching-on of the switch 65 is detected at S45, the film winding motor 106 is stopped at S46 to terminate the winding operation. When the film is entirely exposed during film winding and further film winding becomes impossible, since the film winding completion switch 65 is not switched on, the counter performs a count-up monitoring of the winding completion switch 65 for a time somewhat longer than the time required for the completion of normal film winding, at S47 and S48. When the film winding completion switch is not turned on after the lapse of that time, it is determined to be at film end. The film winding motor 106 is then stopped at S49, a film end flag is set at S50, a film end display is performed at S40, and the process proceeds to S17 to get out of the release processing. When the winding operation has been normally completed, the process proceeds to S51 after S46, and the state of the SW2 (62) is investigated at S52 or S53 in accordance with whether or not the successive photographing mode has been set (the state of the SW 60). In the single-shot mode, monitoring of the SW2 (62) is continued until the SW2 (62) is turned off. In the successive photographing mode, if the SW2 (62) is turned off, release processing is terminated, and if the SW2 (62) is turned on, the process returns to S28, where the processing is repeated. As in the first embodiment, every time in the successive photographing mode, the state of the optical system at photometry and distance measurement immediately before entering into the first release processing is compared with the T mode flag immediately before actual exposure, and if the state of the optical system does not coincide with the T mode flag, actual exposure is not performed and the release processing routine is not completed.

Subsequently, if the SW2 (62) is still kept turned on after the optical system 1 has been set at the telephoto or wide mode and photometry, distance measurement and calculation have been executed again, release processing is performed again. When in the successive photographing mode at this time, successive photographing exposure operations, which had been stopped, are resumed.

Although, in the present embodiment, the state of the optical system is detected immediately before actual exposure, detection of the state of the optical system may be continued during exposure, and when an alteration in the optical system has been detected, the shutter may be immediately closed and film winding and shuter recharge may be performed to enter into a preparatory operation for the next exposure. This is due to the following reason. In the electronic still-picture camera of the first embodiment, even when exposure has been completed, it is possible to perform repeat operations of photometry and distance measurement etc. until the read/record operation has been completed. Hence, the state of the optical system may be detected when exposure has been completed. In a camera using a silver-salt film, however, since an exposure always records on the film, repeat operations may Be performed when an alteration in the optical system has been detected immediately before exposure, but when an alteration of the optical system has been detected during exposure, preparation for the next exposure must be performed assuming that the frame under exposure has failed.

Figure 7:
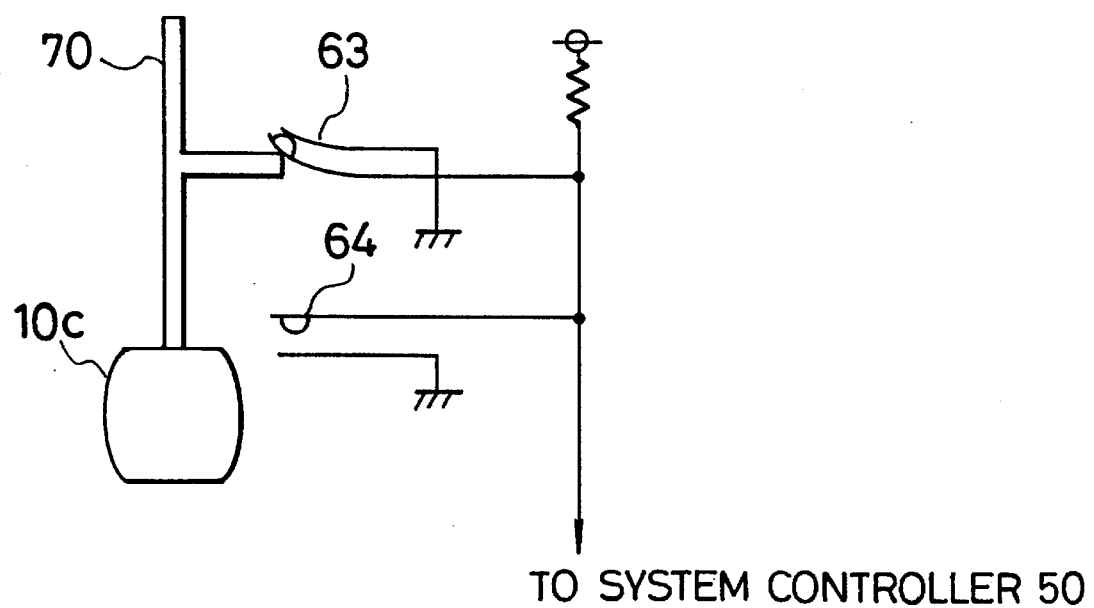
FIG. 7 shows a third embodiment of the present invention.

If the TSW 64 and the WSW 64 are connected in parallel as in FIG. 7, or a switch, which is turned on or off when the optical system is surely at the telephoto or wide state, is used, one input to the system controller 50 can be omitted. In this case, however, the position and open F number of the lens 10a relative to the distance from an object must be identical to those in the telephoto and wide modes.

Although, in the present embodiment, a case of a bifocal system has been explained, the present invention can, of course, be applied to a system having three or more focal lengths.

Furthermore, although the TSW 64 and the WSW 63 are turned on and off by the member 70 for moving the telecon-verter optical system 10c, detection of the state of the optical system becomes surer though the structure becomes complicated, if there is provided a member for locking the member 70 for moving the teleconverter optical system 10c, and the TSW 64 and the WSW 63 are turned on and off by operation of the locking member.

Figure 8B:
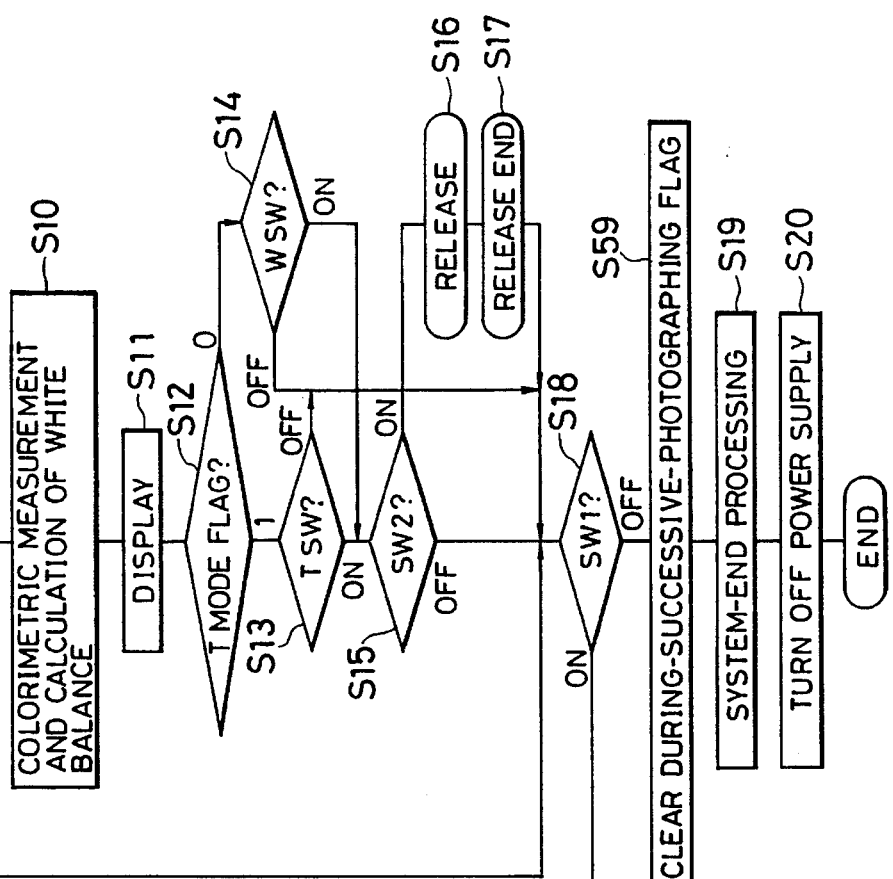
FIGS. 8 and 9 are flow charts of an electronic still-picture camera of the fourth embodiment of the present invention.
Figure 9:
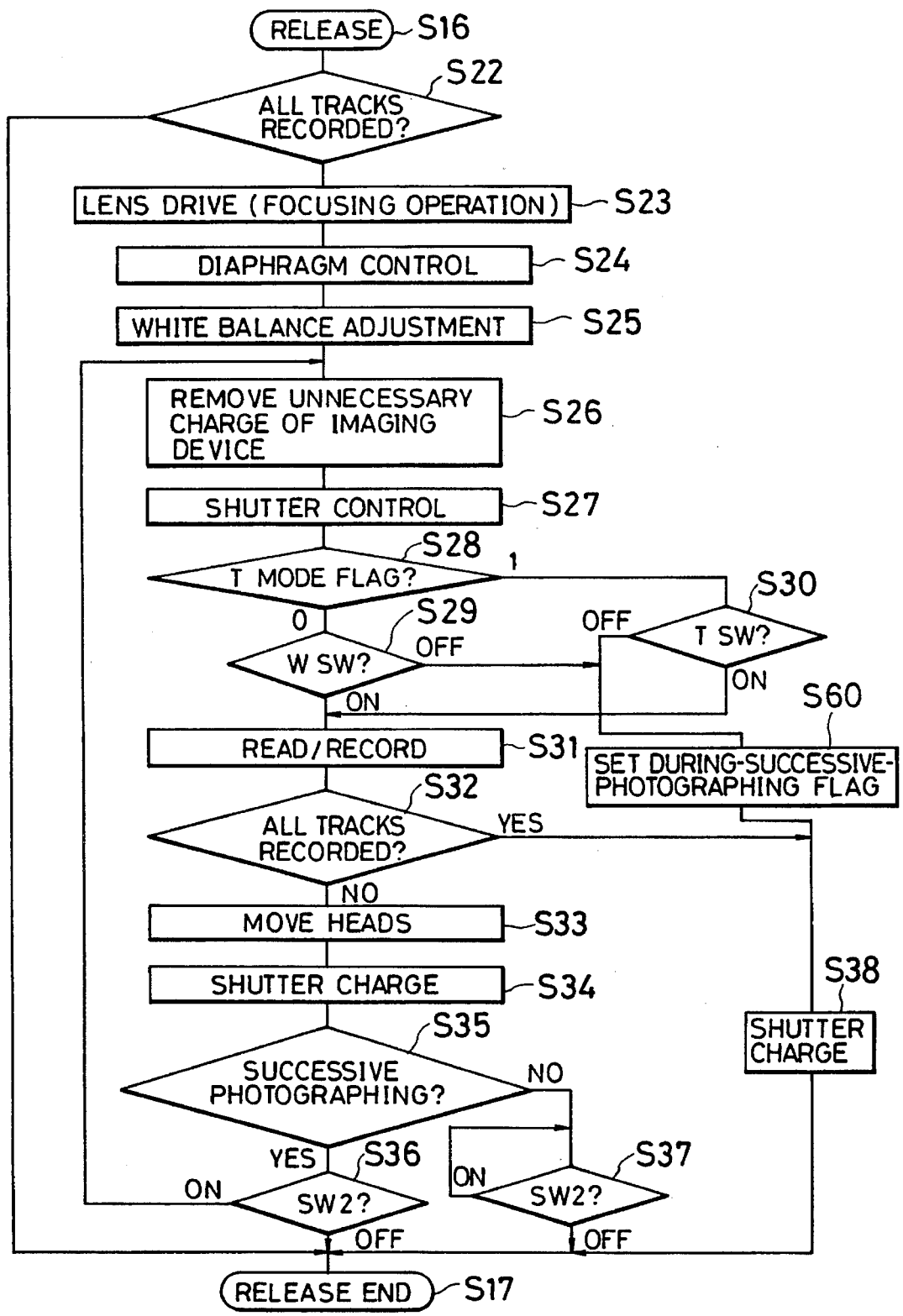

FIGS. 8 and 9 are flow charts of a fourth embodiment of the present invention, and illustrate an example in which repeat operations of photometry and distance measurement can be omitted when the focal state returns to an original state after once having been in an intermediate focal state (both of the TSW 64 and the WSW 63 are turned off) from the telephoto or wide state during successive photographing.

Thus, it is possible to shorten the time from stoppage to reopening of successive photographing.

It is to be noted that, in FIGS. 8 and 9, the same numerals as those in FIGS. 2–7 indicate like steps.

In FIG. 8, a "during-successive-photographing flag" is cleared at S54. The "during-successive-photographing flag" is a flag which becomes 1 when T (W) of the photographic system changes during successive photographing operations.

Figure 2:
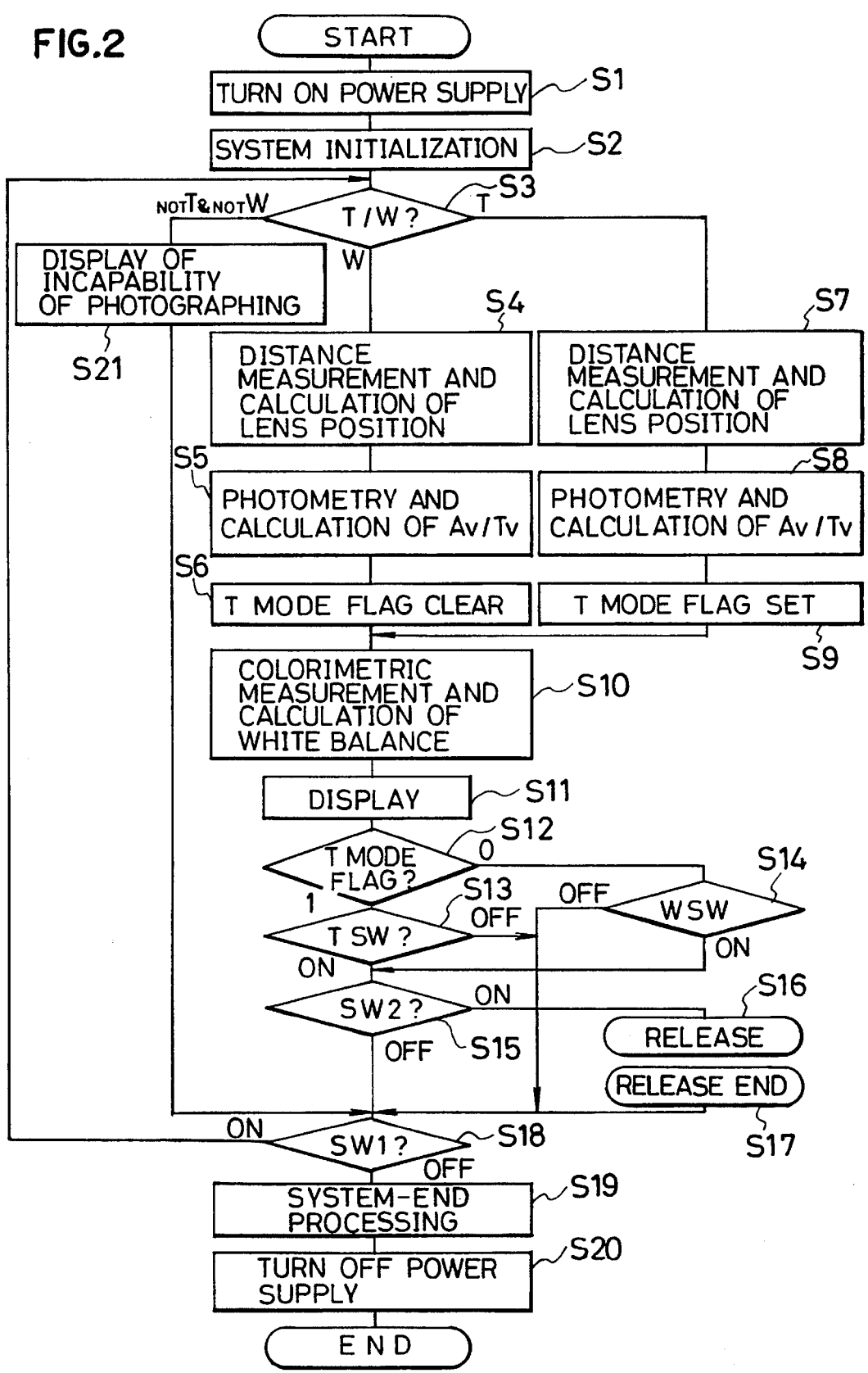
FIGS. 2 and 3 are operation flow charts of the electronic still-picture camera of the first embodiment.

Accordingly, immediately after a power supply has been turned on, if the "during-successive-photographing flag" is determined to be 0 at S55 or S57 after passing through S54 and S3, the process proceeds to S4 and S7, respectively, as in the flow chart in FIG. 2. The following steps are identical to those shown in FIG. 2, up to S16.

After having entered into the release subroutine at S16 shown in FIG. 9, when the state of the T mode flag does not coincide with the states of the WSW and the TSW at S28–S30, that is, when there is a switching of T⇌W, the "during-successive-photographing flag" is set to 1 at S60 before performing the shutter charge at S38.

Accordingly, when subsequently entering into the repeating routine via S17, S18 and S3, the process proceeds to S56 and S58 from S55 and S57, respectively. When the state of the T mode flag coincides with the states of the TSW and the WSW, the process then proceeds to S10, skipping steps of distance measurement, photometry and T mode flag at S4–S6, or S7–S9.

Consequently, if there is a switching of T/W during successive photographing operations, successive photographing is stopped, and successive photographing is resumed only after the T/W has been completely switched.

In FIG. 8, S59 indicates a step for making the "during-successive-photographing flag" 0 when the SW1 is turned off at S18.

As described above, according to the present invention, (1) it is possible to prevent the recording of an abnormal picture caused by changing an optical system during photographing even when an alteration in an optical system of a multifocal camera is performed without using an exclusive actuator (motor).

(2) Furthermore, when it is intended to change an optical system during successive photographing operations, it is possible to change the optical system without detaching a finger from the shutter release button. Moreover, it is also possible to prevent the recording of an abnormal image during that time.

(3) Since the energy held within a camera (usually in a battery) is not consumed for changing an optical system, the camera can be configured in a small size.

The individual components shown in outline or designated by blocks in the Drawings are all well known in the camera art and their specific construction and operation is not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Apparatus for use with a focus-switching camera having an imaging optical system, a focal length of which can be switched between a plurality of stable optical conditions, comprising:

switching means for switching an optical condition of the camera between the plurality of stable optical conditions;

detection means for detecting a switching operation between the plurality of stable optical conditions by said switching means; and control means for stopping a picture recording operation unless said detection means detects that no switching operation of said switching means has begun and that no switching operation from one of the plurality of stable optical conditions to another of the plurality of stable optical conditions has been completed.

2. Apparatus according to claim 1, wherein said camera has a successive photographing function, and wherein said control means (1) stops successive photographing when said detection means detects that said optical system is undergoing a focal length switching operation during successive photographing, and (2) resumes successive photographing when said optical system is not undergoing a focal length switching operation.

3. Apparatus according to claim 2, wherein, when resuming the successive photographing, said control means determines whether or not predetermined characteristics of the optical system have changed from the moment before the successive photographing has been stopped, and when there is a change in predetermined characteristics, said control means resumes successive photographing after (1) measuring parameters corresponding to the changed predetermined characteristics, and (2) resetting the parameters.

4. Apparatus according to claim 1, wherein said control means prohibits picture recording by stopping an exposure operation of said camera.

5. Apparatus according to claim 1, wherein said control means prohibits picture recording by stopping a recording operation of said camera.

6. Apparatus according to claim 1, wherein said detection means and said control means are disposed in a camera which records an optical image on a silver-halide film.

7. Apparatus according to claim 1, wherein said detection means and said control means are disposed in a camera which converts an optical image into electric signals and records said electric signals.

8. Apparatus according to claim 2, wherein said control means resumes successive picture recording in the successive photographing mode when said detection means detects a termination of the switching operation of the optical system.

9. Apparatus according to claim 1, wherein said plurality of optical conditions include a focal length.

10. Apparatus for controlling a camera having a successive photographing mode, in which continuous depression of the shutter release button causes successive photometric operations, and in which an optical system has at least first and second stable optical conditions, comprising:

detection means for detecting whether the camera optical system optical conditions have begun to change or have changed; and processing means for inhibiting picture recording during the successive photographing mode unless said detection means detects that the camera optical system optical conditions have not begun to change and have not changed from the first stable optical condition to the second stable optical condition.

11. Apparatus according to claim 8, wherein said detection means also detects when the camera optical system focal length ceases to change, and wherein said processing means prohibits the camera from recording a picture during the time when the camera optical system focal length is changing.

12. Apparatus according to claim 9, wherein said processing means enables the camera to record a picture after said detection means detects that the camra optical system focal length has ceased to change.

13. Apparatus according to claim 8, wherein said processing means prohibits the camera from recording electrical signals which correspond to an optical image, when said detection means detects the camera optical system focal length has begun to change.

14. Apparatus according to claim 8, wherein said processing means prohibits the camera from recording a picture on a silver-halide film when said detection means detects that the camera optical system focal length has begun to change.

15. Apparatus according to claim 8, wherein said optical conditions include a focal length.

16. Apparatus according to claim 8, wherein said processing means resumes successive picture recording in the successive photographing mode when said detection means detects termination of a change of the optical condition of the optical system.

17. Apparatus for use with a camera that is operable in a successive recording mode and has an imaging optical system with a plurality of stable optical conditions, said apparatus comprising:

switching means for switching an optical condition of said imaging optical system between each of the plurality of stable optical conditions;

detecting means for detecting a stable optical condition of the imaging optical system; and control means for temporarily stopping a successive recording when said detecting means detects that a present optical condition of the imaging optical system has changed from an immediately preceding stable optical condition of an immediately preceding image recording.

18. Apparatus according to claim 17, wherein said control means resumes successive recording after said detecting means detects that the optical condition of said imaging optical system has returned to its original stable optical condition.

19. Apparatus for controlling a camera, having an optical system with at least first and second stable optical conditions, which is operable in a successive recording mode in which continuous depression of a shutter release button causes successive recording operations to be performed, said apparatus comprising:

detecting means for detecting that the optical condition of the camera is changing between successive recording operations from the first stable optical condition to the second stable optical condition; and processing means for temporarily inhibiting picture recording during the successive photographing mode when said detecting means detects that the optical condition of the camera has changed from the first stable optical condition toward the second stable optical condition, wherein said processing means resumes successive recording when said detecting means does not detect a change in optical condition from the first stable optical condition.

20. A camera, having a successive photographing mode, comprising:

calculating means for calculating at least one of photometry information and distance measurement;

an optical system with at least first and second stable optical conditions;

switching means for switching said optical system between the first and second stable optical conditions by a switching operation;

detecting means for detecting that a switching operation from the first stable optical condition to the second stable optical condition has begun and for detecting that said optical system has returned to the first stable optical condition; and control means for inhibiting a new calculation by said calculating means during successive photographing when said detecting means detects that said optical system has returned to the first stable optical condition.

* * * * *

UNITED STATES PATENT AND TRADEMARK OFFICE
CERTIFICATE OF CORRECTION

PATENT NO. : 5,457,512  
DATED : October 10, 1995  
INVENTOR(S) : MAKOTO KONDO

Page 1 of 2

It is certified that error appears in the above-indentified patent and that said Letters Patent is hereby corrected as shown below: Title page:

Item: [56] References Cited

"Ognima et al." should read --Oshima et al.--.

At [57] Abstract

Line 5, "successive" should be deleted.
Line 6, "a" should read --a successive--.

Column 1

Line 21, "fox" should read --for--.

Column 3

Line 40, "ay" should be deleted.

Column 4

Line 5, "diagphragm" should read --diaphragm--.

Column 5

Line 34, "Flow" should read --flow--.

Column 6

Line 4, "the off," should read --off, the--.

UNITED STATES PATENT AND TRADEMARK OFFICE
CERTIFICATE OF CORRECTION

PATENT NO. : 5,457,512

DATED : October 10, 1995

INVENTOR(S) : MAKOTO KONDO

It is certified that error appears in the above-indentified patent and that said Letters Patent is hereby corrected as shown below:

Column 7

```
Line 25, "shuter" should read --shutter--.
Line 35, "Be" should read --be--.
Line 54, "telecon-verter" should read --teleconverter--.
```

Column 8

```
Line 53, "mated" should read --nated--.
```

Column 10

```
Line 3,  "claim 8," should read --claim 10,--.
Line 8,  "claim 9," should read --claim 11,--.
Line 10, "camra" should read --camera--.
Line 12, "claim 8," should read --claim 10,--.
Line 17, "claim 8," should read --claim 10,--.
Line 22, "claim 8," should read --claim 10,--.
Line 24, "claim 8," should read --claim 10,--.
```

Signed and Sealed this

Twenty-sixth Day of March, 1996

*Attest:*

BRUCE LEHMAN

*Attesting Officer*   *Commissioner of Patents and Trademarks*